United States Patent [19]
Narisawa et al.

[11] Patent Number: 5,198,949
[45] Date of Patent: Mar. 30, 1993

[54] THIN FILM MAGNETIC HEAD WITH SHAPED MAGNETIC LAYER

[75] Inventors: Hiroaki Narisawa; Norio Saito; Wataru Ishikawa; Jin Sato; Takashi Watanabe, all of Miyagi, Japan

[73] Assignee: Sony Corporation, Tokyo, Japan

[21] Appl. No.: 708,231

[22] Filed: May 31, 1991

[30] Foreign Application Priority Data

May 31, 1990 [JP] Japan .................... 2-139640

[51] Int. Cl.⁵ .................... G11B 5/127; G11B 5/23
[52] U.S. Cl. .................... 360/126; 360/119
[58] Field of Search .................... 360/126, 119; 29/603

[56] References Cited

U.S. PATENT DOCUMENTS

| | | | |
|---|---|---|---|
| 4,190,872 | 2/1980 | Jones, Jr. et al. | 360/125 |
| 4,511,942 | 4/1985 | Valstyn | 360/126 |
| 4,636,897 | 1/1987 | Nakamura et al. | 360/119 |
| 4,853,815 | 8/1989 | Diepers | 360/119 |
| 4,854,035 | 8/1989 | Gukkenberger et al. | 360/119 |

FOREIGN PATENT DOCUMENTS

| | | | |
|---|---|---|---|
| 58-100212 | 6/1983 | Japan | 360/119 |
| 60-258716 | 12/1985 | Japan . | |
| 61-045407 | 3/1986 | Japan . | |
| 61-45408 | 3/1986 | Japan | 360/119 |

Primary Examiner—Robert S. Tupper
Attorney, Agent, or Firm—Hill, Steadman & Simpson

[57] ABSTRACT

A thin film magnetic head has a lower magnetic layer and an upper magnetic layer formed over the lower magnetic layer so that a small gap is formed between a magnetic gap section of the lower magnetic layer near a sliding surface to be brought into sliding contact with a magnetic recording medium and a magnetic gap section of the upper magnetic layer extending in parallel to the magnetic gap section of the lower magnetic layer near the sliding surface. The upper magnetic layer has a first sloping section extending from the magnetic gap section at an inclination $\theta_1$ in a range defined by $2° \leq \theta_1 \leq 25°$ to the upper surface of the lower magnetic layer, and a second sloping section extending from the first sloping section at an inclination $\theta_2$ in a range defined by: $30° \leq \theta_2 \leq 80°$ to the upper surface of the lower magnetic layer. Magnetic flux leaks across the lower magnetic layer and the first inclined section of the upper magnetic layer, so that the magnetic saturation of the magnetic gap section of the upper magnetic layer is prevented. Since the second sloping section is inclined at a large inclination, the overwrite characteristics is not deteriorated.

3 Claims, 10 Drawing Sheets

5,198,949

THIN FILM MAGNETIC HEAD WITH SHAPED MAGNETIC LAYER

BACKGROUND OF THE INVENTION

1. Field of the Invention

The present invention relates to a thin film magnetic head suitable for writing information in or reading recorded information from a magnetic recording medium, such as a hard disk.

2. Description of the Prior Art

The magnetic film and conductive coils of the magnetic circuit of a thin film magnetic head, in general, are formed by vacuum thin film forming techniques. Accordingly, the thin film magnetic head has a narrow magnetic gap which can readily be formed and is capable of dealing with very narrow tracks, high-resolution recording and high-density recording.

Generally the magnetic circuit of such a thin film magnetic head comprises a lower magnetic layer, an insulating film formed over the surface of the lower magnetic layer, a single or a plurality of superposed conductive coil layers formed on the insulating film, an insulating film formed over the conductive coil or conductive coils, and an upper magnetic layer formed over the insulating film.

Efforts have been made in the field of thin film magnetic heads in recent years for the reduction of track width and for the further improvement of the electromagnetic characteristics, particularly, the enhancement of recording and reproducing output of the thin film magnetic head to cope with the recent progressive reduction in track width of a recording medium. However, the thin film magnetic head has a large magnetic reluctance and is readily saturated magnetically because the sectional area of the magnetic thin film of the thin film magnetic head is smaller than that of a magnetic head of a bulk type. Magnetic saturation is liable to occur particularly in the magnetic gap section of the thin film magnetic head, having a particularly small sectional area. The magnetic saturation of the magnetic gap section increases the effective gap length in recording operation, reduces recording density and deteriorates the electromagnetic conversion characteristics. The saturation of the magnetic gap section of the thin film magnetic head may be obviated by increasing the thickness of the magnetic film to increase the sectional area of the core or by increasing the depth. However, it is difficult to form the magnetic film in a thickness large enough to obviate the saturation, and increase in the depth, which is effective for obviating the saturation though, deteriorates the overwrite characteristics.

SUMMARY OF THE INVENTION

Accordingly, it is an object of the present invention to provide a thin film magnetic head having a magnetic gap section difficult to be saturated, and capable of effectively increasing recording density and of operating at a high reproducing efficiency.

In view of the foregoing object, the present invention, the present invention provides a thin film magnetic head having a magnetic gap formed by forming a lower magnetic layer and an upper magnetic layer one over the other so that the respective magnetic gap sections of the lower and upper magnetic layers near the sliding surface that is brought into sliding contact with a magnetic recording medium extend opposite to and in parallel to each other with a small gap therebetween, wherein the upper magnetic layer has a first sloping section merging into the magnetic gap section, and a second sloping section merging into the first sloping section, the inclination $\theta_1$ of the first sloping section to the lower magnetic layer is in a range defined by: $2° \leq \theta_1 \leq 25°$, and the inclination $\theta_2$ of the second sloping section to the lower magnetic layer is in a range defined by: $30° \leq \theta_2 \leq 80°$.

The thin film magnetic head in accordance with the present invention is characterized in that the thickness of the upper magnetic layer is not more than 3 µm.

Furthermore, the thin film magnetic head in accordance with the present invention is characterized in that the track width is not more than 10 µm.

Since the upper magnetic layer has the magnetic gap section extending in parallel to the lower magnetic layer, the first sloping section extending from the magnetic gap section, and the second sloping section extending from the first sloping section, and the first sloping section is a comparatively gentle slop of an inclination not less than 2° and not greater than 25°, magnetic flux leaks across the sloping section and the lower magnetic layer to suppress the magnetic saturation of the magnetic gap section.

The second sloping section extending from the first sloping section in a comparatively steep slope of an inclination not less than 30° and not more than 80° to the lower magnetic layer prevents the deterioration of the overwrite characteristics of the thin film magnetic head.

The upper magnetic layer having a thickness not greater than 3 µm prevents the deterioration of the recording density characteristics even if the gap length and the track width are reduced.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
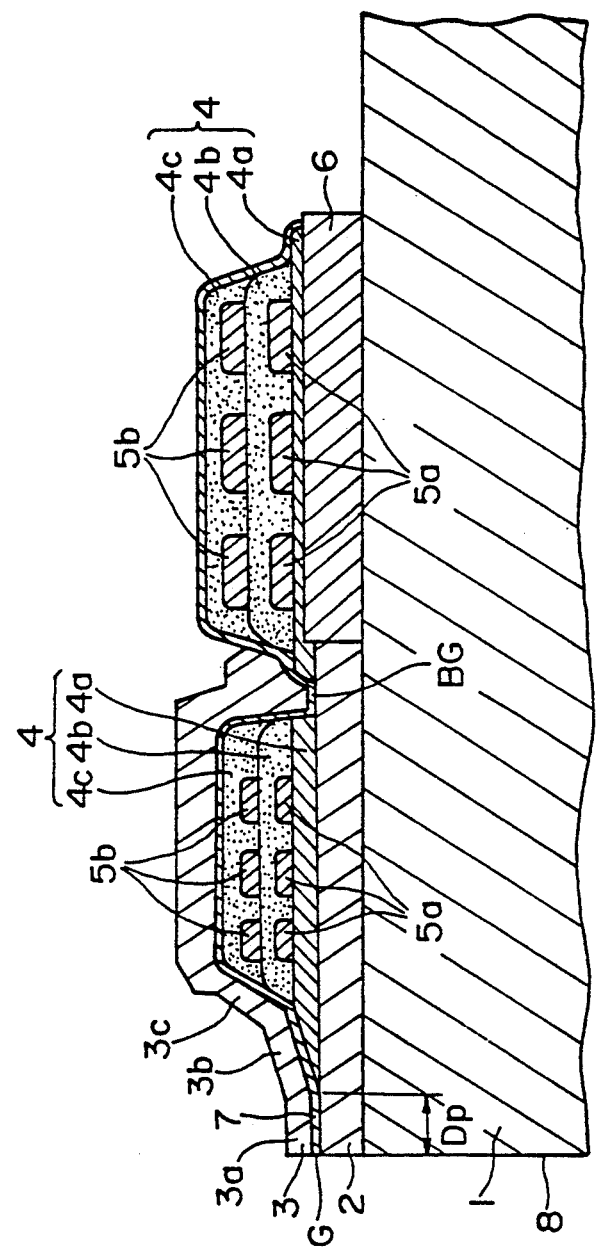
FIG. 1 is a sectional view of a thin film magnetic head in a first embodiment according to the present invention.

Referring to FIG. 1, a thin film magnetic head in a first embodiment according to the present invention has a lower magnetic layer 2 over the surface of a substrate 1, and an upper magnetic layer 3 formed over the lower magnetic layer 2. The respective front portions, namely, portions near the sliding surface to be brought into sliding contact with a recording medium, of the lower magnetic layer 2 and the upper magnetic layer 3 are formed so as to extend opposite to and parallel to each other with a small gap therebetween to form a front gap FG, i.e., a magnetic gap.

The substrate 1 is formed of a nonmagnetic material, such as calcium titanate, a ceramic material or alumina. The substrate 1 may be such as formed of a ferromagnetic material, such as a Mn-Zn ferrite or a Ni-Zn ferrite. When the substrate 1 is formed of a ferromagnetic material, a nonmagnetic film, such as an alumina film, must be formed over the surface of the substrate 1 to insulate the lower magnetic layer 2 from the substrate 1.

The lower magnetic layer 2 and the upper magnetic layer 3 form a magnetic circuit. The lower magnetic layer 2 is formed so as to extend substantially perpendicularly to the track width, namely, in the direction of depth of the front gap FG, and slightly beyond a position corresponding to a back gap BG.

The lower magnetic layer 2 is formed of a ferromagnetic material having a high saturation magnetic flux density and excellent soft magnetic characteristics. The lower magnetic layer 2 may be formed of any known crystalline or amorphous ferromagnetic material. Possible materials for forming the lower magnetic layer 2 are, for example, ferromagnetic metals, such as Fe-Al-Si alloys, Fe-Al alloys, Fe-Si-Co alloys, Fe-Ni alloys, Fe-Al-Ge alloys, Fe-Ga-Ge alloys, Fe-Si-Ge alloys and Fe-Co-Si-Al alloys, or Fe-Ga-Si alloys, Fe base alloys, Ga base alloys, Co base alloys including Fe base alloys partly substituted by Co, and Si base alloys containing at least one of Ti, Cr, Mn, Zr, Nb, Mo, Ta, W, Ru, Os, Rh, Ir, Re, Ni, Pb, Pt, Hf and V to improve the corrosion resistance and abrasion resistance of the foregoing ferromagnetic materials.

Possible amorphous ferromagnetic alloys, i.e., so-called amorphous alloys, are alloys containing at least one of Fe, Ni and Co and at least one of P, C, B and Si, metal-metalloid alloys containing at least one of Fe, Ni and Co and at least one of P, C, B and Si as principal components and containing Al, Ge, Be, Sn, In, Mo, W, Ti, Mn, Cr, Zr, Hf or Nb, and metal-metal amorphous alloys containing, as principal components, a transition element or a rare earth element, such as Co, Hf or Zr.

The lower magnetic layer 2 may b formed by a plating process or a vacuum thin film forming process, such as an evaporation process, a sputtering process or an ion plating process. The lower magnetic layer 2 in this embodiment was formed by a plating process. The lower magnetic layer 2 is thicker than the upper magnetic layer 3. A desirable thickness of the lower magnetic layer 2 is, for example, not less than 3 $\mu$m and not greater than 10 $\mu$m in view of increasing magnetic flux leakage in the front portion. The lower magnetic layer of a thickness in such a range increases magnetic flux leakage across the lower magnetic layer 2 and the first sloping section 3b of the upper magnetic layer 3 to prevent the magnetic saturation of the front portion.

A coil base layer 6 is formed on the substrate 1 as a base for spiral conductive coils 5a and 5b formed between the lower magnetic layer 2 and the upper magnetic layer 3. The coil base layer 6 is formed contiguously with the back side of the lower magnetic layer 2 so as to extend in the direction of depth of the front gap FG.

A first insulating layer 4a for insulating the first conductive coil 5a from the lower magnetic layer 2 is formed over the entire surface of the lower magnetic layer 2 excluding areas corresponding to the front gap FG and the back gap BG. The first insulating layer 4a serves for shaping the front portion of the upper magnetic layer 3 as well as for insulating the first conductive coil 5a from the lower magnetic layer 2. The first insulating layer 4a covers also the coil base layer 6 as well as the lower magnetic layer 2.

The first conductive coil 5a is formed between the lower magnetic layer 2 and the coil base layer 6 on the first insulating layer 4a. A current is supplied in a predetermined direction through the first conductive coil 5a to the lower magnetic layer 2 and the upper magnetic layer 3. The first conductive coil 5a is formed of a conductive metal, such as Cu or Al, by plating and may be a helical coil or a zigzag coil.

A second insulating layer 4b is formed over the first insulating layer 4a so that the first conductive coil 5a is embedded therein to insulate the second conductive coil 5b from the first insulating coil 5a. The upper surface of the second insulating layer 4b is flat. The spiral second conductive coil 5b is formed on the second insulating layer 4b so that the first conductive coil 5a and the second conductive coil 5b are stacked in layers. The front portions of the second insulating layer 4b and a third insulating layer 4c, as well as that of the first insulating layer 4a, shapes the front portion of the upper magnetic layer 3.

A gap film 7 of a nonmagnetic material, such as $SiO_2$ or $Ta_2O_5$ is formed over the insulating layer 4 comprising the first insulating layer 4a, the second insulating layer 4b and the third insulating layer 4c, and areas corresponding to the front gap FG and the back gap BG, and the upper magnetic layer 3, which constitute a magnetic circuit in cooperation with the lower magnetic layer 2, is formed over the gap film 7.

The upper magnetic layer 3 extends from a position corresponding to the central portions of the spiral conductive coils 5a and 5b to a position corresponding to the sliding surface 8 to be disposed opposite to a magnetic recording medium. The back gap BG is formed by a portion of the gap film 7 between a portion of the lower magnetic layer 2 and a portion of the upper magnetic layer 3 in the central portions of the spiral conductive coils 5a and 5b. The front gap FG is formed by a portion of the gap film 7 between the respective front portions of the lower magnetic layer 2 and the upper magnetic layer 3 near the sliding surface 8. Thus, the conductive coils 5a and 5b are sandwiched between the lower magnetic layer 2 and the upper magnetic layer 3, and the lower magnetic layer 2 and the upper magnetic layer 3 are coupled magnetically with the front gap FG and the back gap BG therebetween to form a magnetic circuit.

Figure 2:
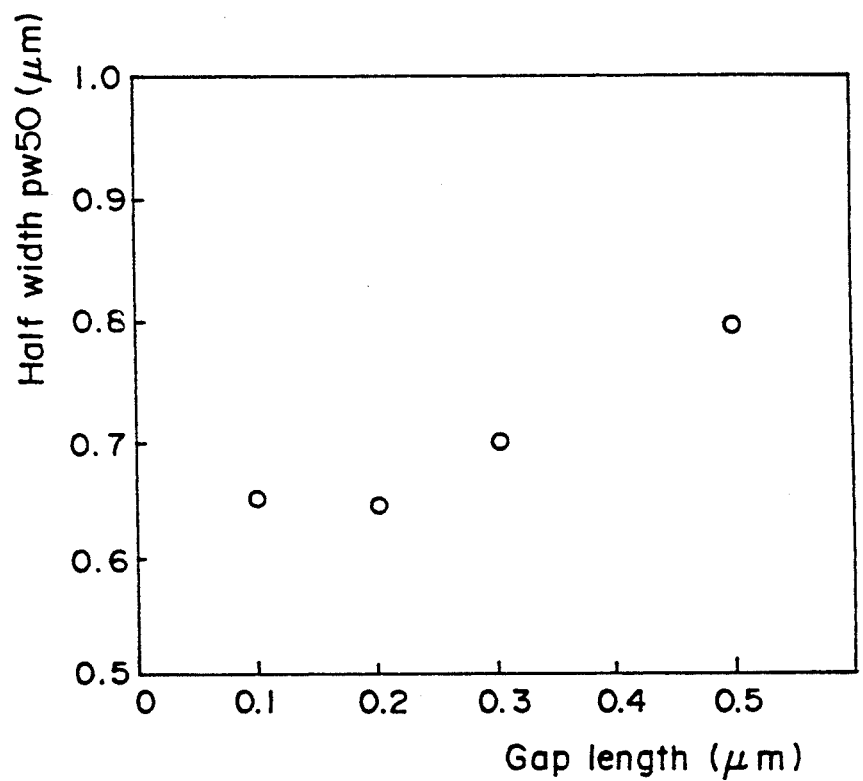
FIG. 2 is a graph showing the dependence of the half width on the gap length.

In view of reproducing efficiency, the gap length g of the front gap FG is a value in a range defined by $0 < g \leq 0.6 \mu m$. This range of the gap length g is determined with reference to the dependence of half width PW50 on the gap length g shown in FIG. 2. The magnetic saturation of the front portion can be suppressed even if the gap length g is in a very small value in the range of 0.1 to 0.5 $\mu m$, and the output is suitable for high-density recording.

Figure 3:
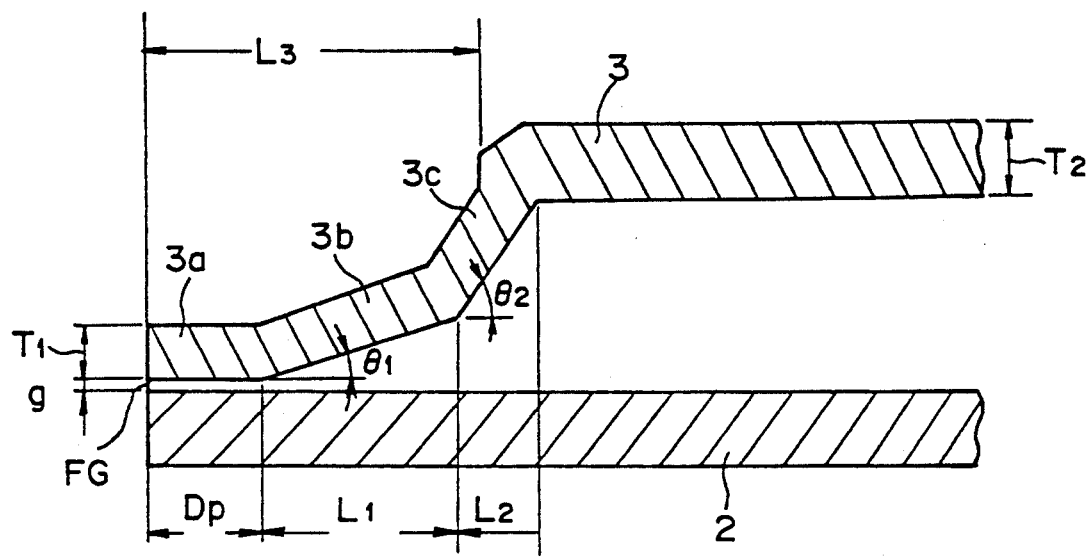
FIG. 3 is an enlarged sectional view of an essential portion of magnetic layers.

As shown in FIG. 3, the upper magnetic layer 3 has a front portion consisting of a magnetic gap section 3a extending in parallel to the lower magnetic layer 2, a first sloping section 3b extending from the magnetic gap section 3a, and a second sloping section 3c extending from the first sloping section 3b. The magnetic gap section 3a is formed in parallel to the lower magnetic layer 2 in a length equal to a depth Dp from the sliding surface 8 so as to form the front gap FG between the lower magnetic layer 2 and the upper magnetic layer 3 with the gap film 7 therebetween.

The first sloping section 3b is formed so as to incline to the lower magnetic layer 2 at an inclination $\theta_1$ in a range defined by: $2° \leq \theta_1 \leq 25°$, and so that the length $L_1$ of its orthogonal projection on the upper surface of the loser magnetic layer 2 is in a range defined by: $3 \leq L_1 \leq 10 \mu m$ so as to diverge from the lower magnetic layer 2 with distance from the junction of the magnetic gap section 3a and the first sloping section 3b. If the inclination $\theta_1$ is less than 2°, the gradient of the first sloping section 3b is excessively small and the depth Dp increases virtually to deteriorate the overwrite characteristics of the thin film magnetic head. On the contrary, if the inclination $\theta_1$ is greater than 25°, the distance between the first sloping section 3b and the lower magnetic layer 2 is excessively large, and hence the magnetic gap section 3a is saturated during reproducing operation. If the length $L_1$ is greater than 10 $\mu m$, the distance between the first sloping 3b and the lower magnetic layer 2 is excessively large, and hence leakage flux increases excessively to reduce the output of the thin film magnetic head.

The second sloping section 3c extends from the rear edge of the first sloping section 3b so as to incline at an inclination $\theta_2$ in a range defined by: $30° \leq \theta_2 \leq 80°$ to the upper surface of the lower magnetic layer 2 and so that the length $L_2$ of its orthogonal projection on the upper surface of the lower magnetic layer is in a range defined by $3 \leq L_2 \leq 30 \mu m$. The second sloping section 3c diverges from the lower magnetic layer 2 with distance from the junction of the first sloping section 3b and the second sloping section 3c. If the inclination $\theta_2$ is less than 30°, the gradient of the second sloping section 3c is excessively small, which makes forming the conductive coils 5a and 5b difficult and deteriorates the overwrite characteristics. The reproducing output increases is increased when the conductive coils 5a and 5b are formed at a position close to the gap portion, and hence the second sloping section 3c is formed in the length $L_2$ in the aforesaid range. If the length $L_2$ is less than 3 $\mu m$ or greater than 30 $\mu m$, the reproducing output decreases and it is difficult to form the conductive coils 5a and 5b. In the thin film magnetic head in this embodiment, the length $L_2$ is 10 $\mu m$, which is an optimum value satisfying both a condition for sufficient reproducing output and a condition for forming the conductive coils 5a and 5b.

Figure 4:
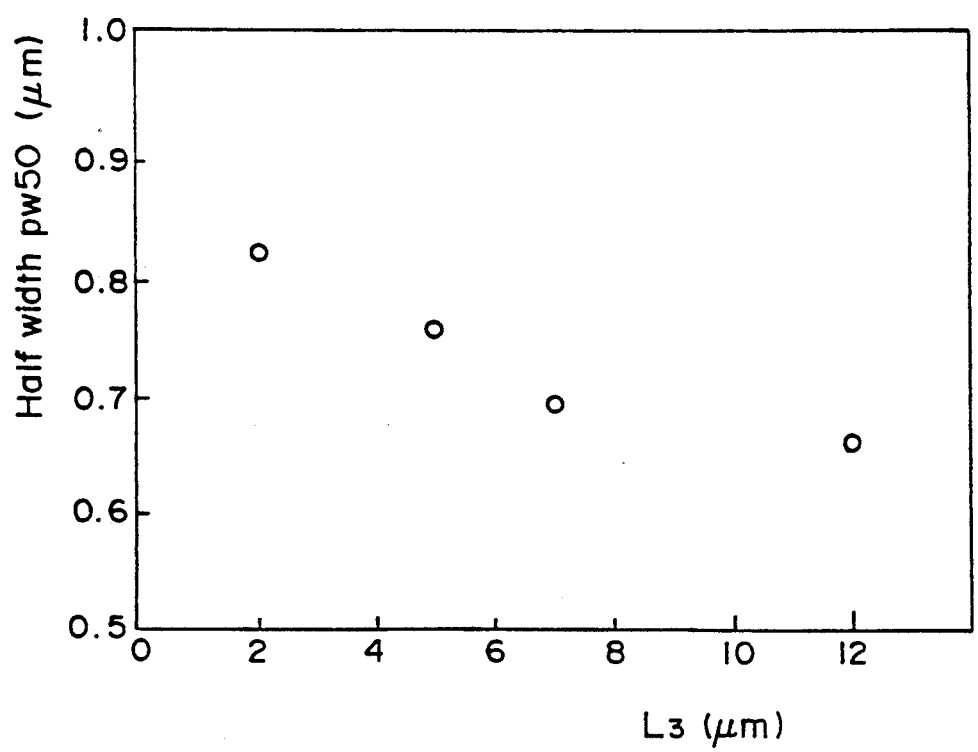
FIG. 4 is a graph showing the dependence of the half width on the length of the front portion of an upper magnetic layer.

The thickness of the upper magnetic layer 3 having a front portion having a section resembling a segment line is 3 $\mu m$ or less to avoid the deterioration of recording density characteristics when the gap length and the track width are small. In view of reproducing efficiency, the thickness of the upper magnetic layer 3 must be 1 $\mu m$ or above. In forming the upper magnetic layer 3 in such a small thickness, it is preferable to form only the front portion of the upper magnetic layer 3 in a thickness of 3 $\mu m$ or below and to form the back portion of the same in a thickness on the order of 5 $\mu m$. From FIG. 4, a preferable value of the length $L_3$ of a portion of the front portion of the upper magnetic layer 3 to be formed in a thickness of 3 $\mu m$ or below is in the range of 3 $\mu m$ to about 10 $\mu m$ in view of PW50. Naturally, the recording density characteristics of the thin film magnetic head having the upper magnetic layer 3 of a uniform thickness of 3 $\mu m$ in an area between the front gap FG and the back gap BG are better than those of the thin film magnetic head having the upper magnetic layer 3 of a uniform thickness of 5 $\mu m$ in the area between the front gap FG and the back gap BG. Values in FIG. 4 are for depth Dp=2 $\mu m$, gap length g=0.3 $\mu m$, flying height FH=0.17 $\mu m$ and current Iw=30 mAop.

Figure 5:
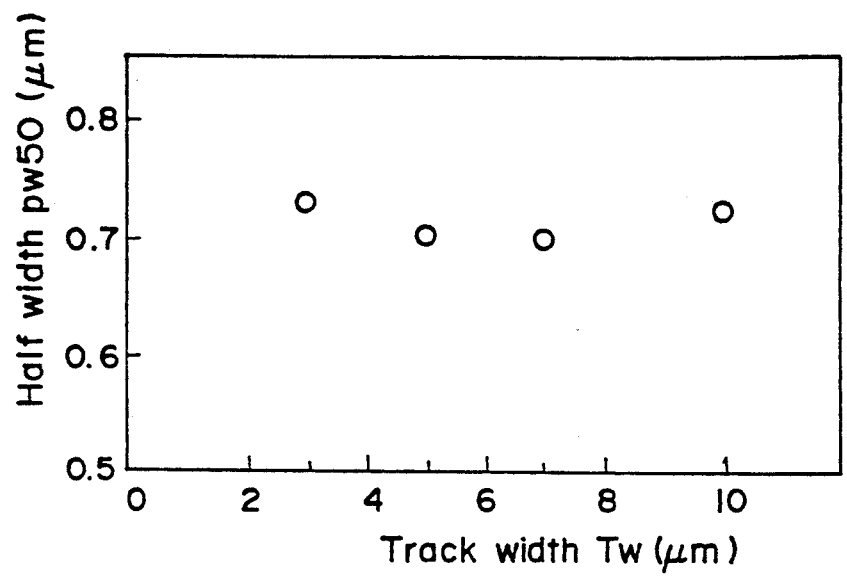
FIG. 5 is a graph showing the dependence of the half width on the track width.

Desirably, the track width of the front gap FG formed between the lower magnetic layer 2 and the upper magnetic layer 3 is 10 $\mu m$ or below. Generally, the front portion of a magnetic head is saturated and the output is reduced if the track width is 10 $\mu m$ or below. However, as is obvious from FIG. 5 showing the dependence of half width PW50 on track width Tw, the output of the thin film magnetic head of the present invention is not reduced even if the track width Tw is 3 $\mu m$. That is, the front portion of the thin film magnetic head embodying the present invention is not saturated even if the track width is reduced. Values in FIG. 5 are for depth Dp=1 $\mu m$, gap length g=0.3 $\mu m$, flying height FH=0.17 $\mu m$ and current Iw=30 mAop.

Since the thin film magnetic head thus constructed has the upper magnetic layer having the first sloping section 3b extending in a comparatively gentle slop from the magnetic gap section 3a, the length of the orthogonal projection of the first sloping section 3b on the lower magnetic layer 2 is comparatively short, and magnetic flux leakage in the section between the first sloping section 3b and the corresponding section of the lower magnetic layer 2 prevents the magnetic saturation of the magnetic gap section 3a. Accordingly, the recording density characteristics are not deteriorated and recording and reproducing operations can satisfactorily be achieved even if the gap length and the track width are reduced.

Figure 6:
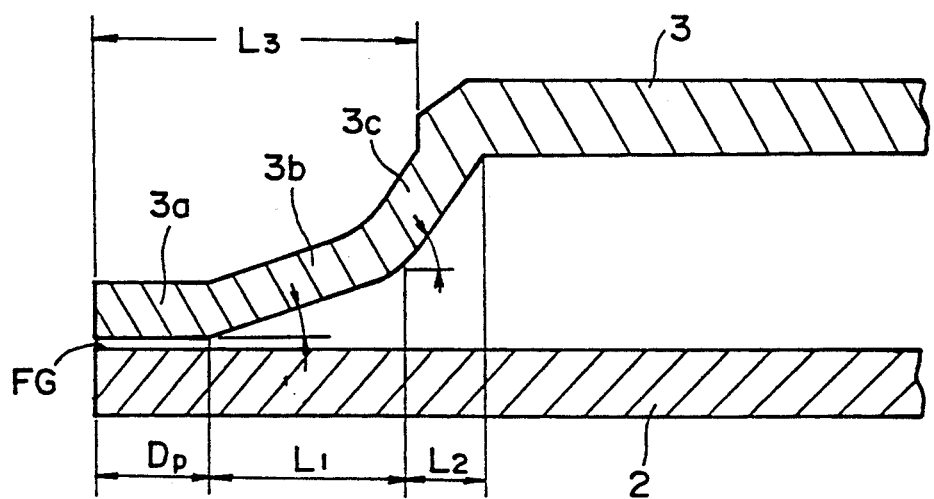
FIG. 6 is an enlarged sectional view of the front portion of an upper magnetic layer in a modification.

Although the junction of the first sloping section 3b and the second sloping section 3c is shown in a shape having sharp edges in FIG. 1 to facilitate understanding the shape of the front portion of the upper magnetic layer 3, the junction of the first sloping section 3b and the second sloping section 3c may be rounded as shown in FIG. 6 or the first sloping section 3b and the second sloping section 3c may be curved gently without departing from the scope of technical idea of the present invention.

The effect of forming the front portion of the upper magnetic layer 3 in the foregoing shape on the prevention of magnetic saturation of the magnetic gap section 3a is inferred to be due to the following facts.

Figure 7:
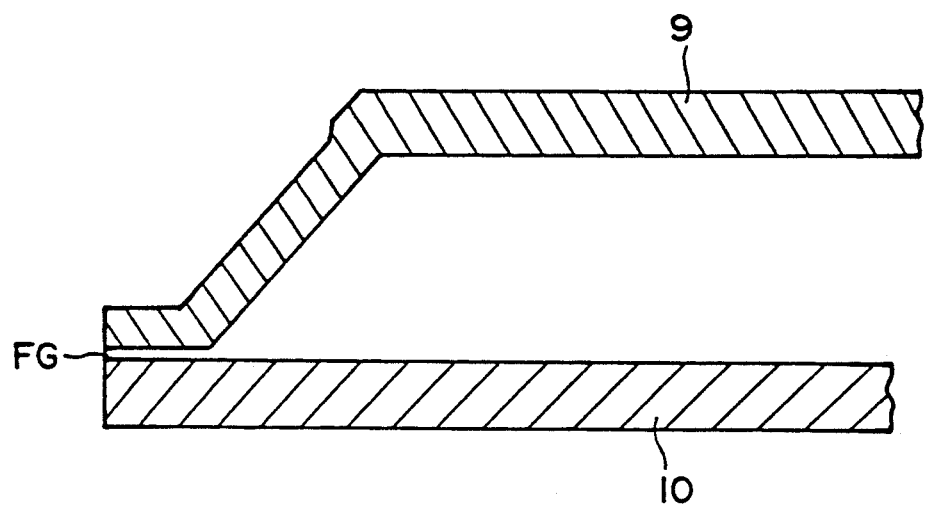
FIG. 7 is an enlarged sectional view of the magnetic layers of a conventional thin film magnetic head employed in calculating recording density on the basis of the sectional shape.

Recording density was calculated on the basis of the shape of the thin film magnetic head shown in FIG. 3, and that of a conventional thin film magnetic head having an upper magnetic layer 9 and a lower magnetic layer 10 facing each other in an area of a comparatively large length as shown in FIG. 7. Parameters used for calculation are shown in Tables 1 and 2.

The recording density characteristics were calculated by using those parameters by a finite element method.

Figure 8:
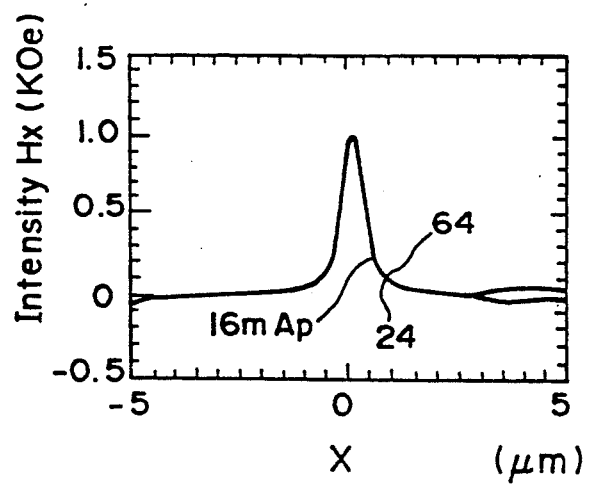
FIG. 8 is a graph showing the distribution of the magnetic field intensity of the thin film magnetic head of FIG. 1.
Figure 9:
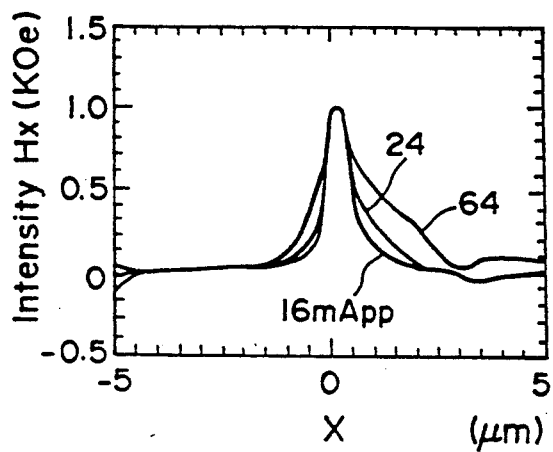
FIG. 9 is a graph showing the distribution of the magnetic field intensity of a conventional thin film magnetic head.

First, the distribution of the magnetic intensity of magnetic fields created by the thin film magnetic head of the present invention and the conventional thin film magnetic head was calculated. Calculated results for the thin film magnetic head of the present invention are shown in FIG. 8 and those for the conventional thin film magnetic head are shown in FIG. 9. As is obvious from FIGS. 8 and 9, the magnetic field created by the conventional thin film magnetic head expands with recording current, whereas the magnetic field created by the thin film magnetic head of the present invention expands scarcely with recording current.

Figure 10:
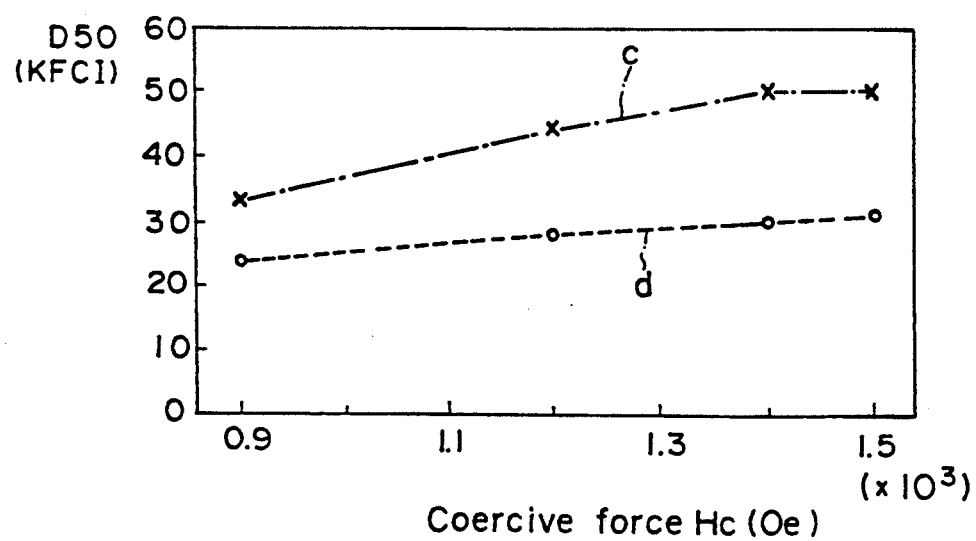
FIG. 10 is a graph showing the variation of values of D50 with coercive force.

A thin film magnetic head having a construction in accordance with the present invention as shown in FIG. 3 and a conventional thin film magnetic head were fabricated and values of D50 were measured. Measured results are shown in FIG. 10, in which a curve c indicates the relation between D50 and coercive force for the thin film magnetic head in accordance with the present invention and a curve d indicates the relation between D50 and coercive force for the conventional thin film magnetic head. As is obvious from FIG. 10, the thin film magnetic head of the present invention has a considerably large D50 of about 50 kFCI as compared with the D50 of abut 30 kFCI of the conventional thin film magnetic head. Accordingly, the thin film magnetic head of the present invention is expected to enable the enhancement of recording density and high-frequency recording.

A process of fabricating a thin film magnetic head in accordance with the present invention as shown in FIG. 1 will be described hereinafter with reference to the accompanying drawings.

Figure 11:
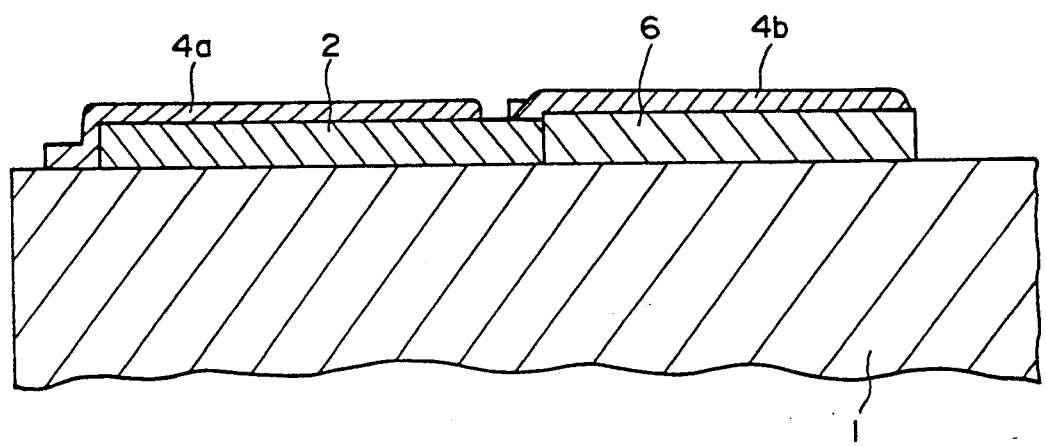
FIG. 11 is an enlarged sectional view of assistance in explaining an auxiliary layer forming step for a lower magnetic layer and coils in a process of fabricating the thin film magnetic head of FIG. 1.

Referring to FIG. 11, a magnetic thin film is formed over one of the major surface of a substrate 1 of a ceramic maternal or the like by a vacuum thin film forming method, such as evaporation or sputtering, and the the magnetic thin film is patterned to form a lower magnetic layer 2.

A coil base layer 6 is formed contiguously with the back end of the lower magnetic layer 2. The coil base layer 6 is slightly thicker than the lower magnetic layer 2.

Then, a first insulating layer 4a is formed over the lower magnetic layer 2 and the coil base layer 6 in a shape for dominating the shape of the front portion of an upper magnetic layer 3. The first insulating layer 4a is formed by using a resist film so as to cover the lower magnetic layer 2 and the coil base layer 6 entirely excluding an area in which a back gap BG is to be formed.

The thickness of the first insulating layer 4a and the processing temperature are regulated so that the front portion of the upper magnetic layer 3 may be formed in a shape meeting the foregoing conditions.

Figure 12:
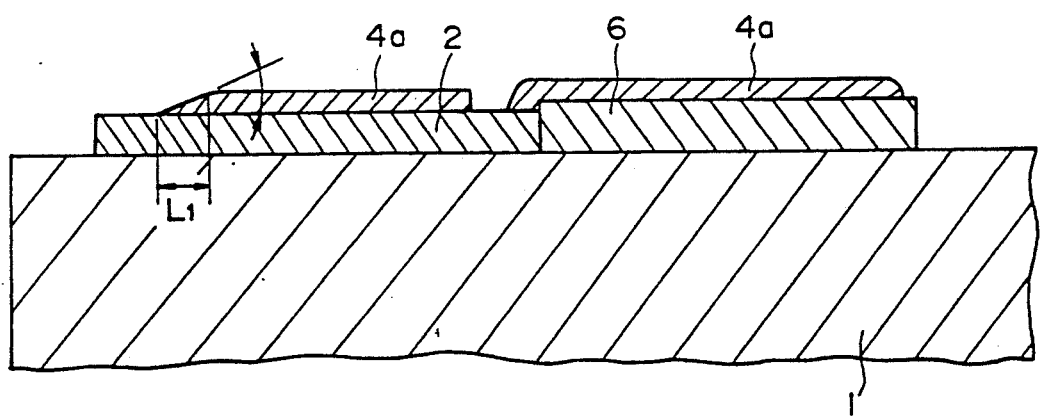
FIG. 12 is an enlarged sectional view of assistance in explaining an insulating layer forming step in the process for fabricating the thin film magnetic head of FIG. 1.

Subsequently, as shown in FIG. 12, the front portion of the first insulating layer 4a is shaped. The front portion of the first insulating layer 4a is removed partially so that the front portion has a sloping surface extending upward from a position corresponding to the depth Dp of the front gap FG at an inclination $\theta_1$ in a range defined by: $2° \leq \theta_1 \leq 25°$ to the surface of the lower magnetic layer 2. The length $L_1$ of a portion of the lower magnetic layer 2 corresponding to the sloping surface of the first insulating layer 4a is in a range defined by: $3 \mu m \leq L_1 \leq 10 \mu m$, which applies also to the length of a portion of the upper magnetic layer 3 facing the lower magnetic layer 2.

Figure 13:
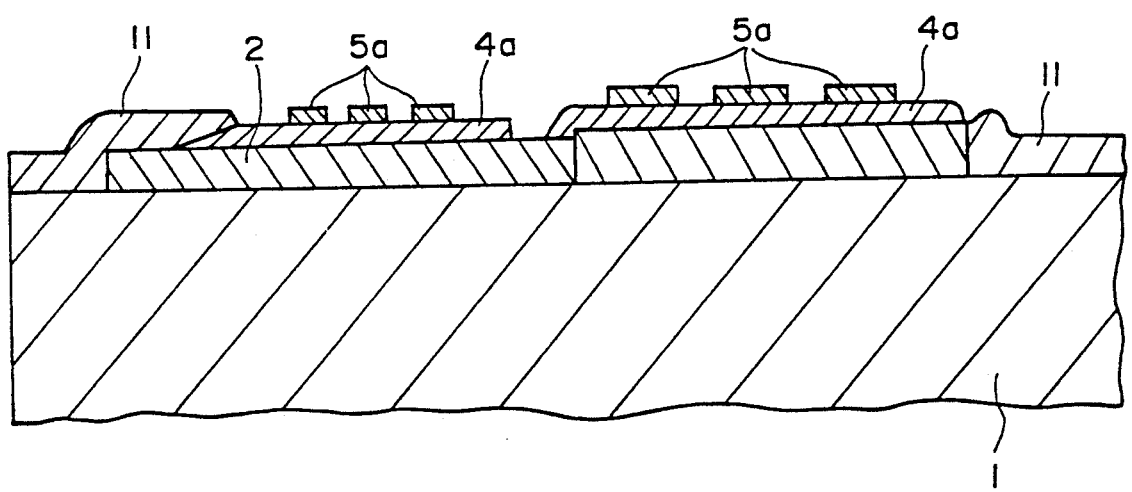
FIG. 13 is an enlarged sectional view of assistance in explaining a first conductive coil forming step in the process of fabricating the thin film magnetic head of FIG. 1.

Then, conductive coils are formed on the first insulating layer 4a. As shown in FIG. 13, the sloping surface of the front portion of the first insulating layer 4a is covered with a resist film 11 to keep the shape of the sloping surface of the first insulating layer 4a unchanged.

A base film, not shown, is formed over the first insulating layer 4a by sputtering, a conductive film of Cu, Al or the like is formed over the base film by plating, the conductive film is patterned to form a spiral first conductive coil 5a, the base film is removed, and then the work is washed.

Figure 14:
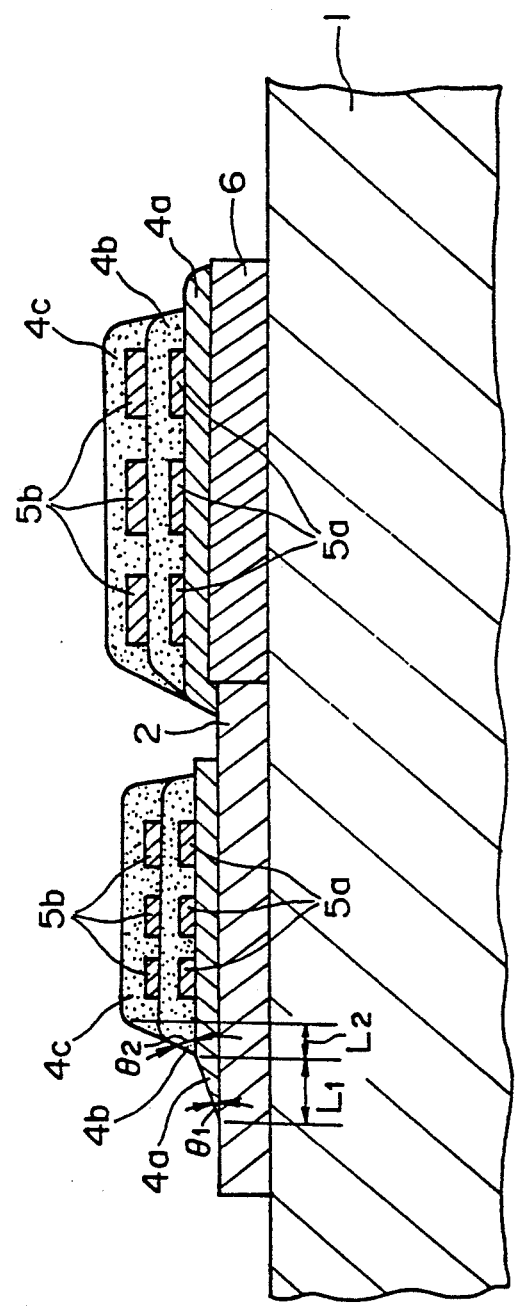
FIG. 14 is an enlarged sectional view of assistance in explaining steps of forming a second conductive coil, a second insulating layer and a third insulating layer in the process of fabricating the thin film magnetic head of FIG. 1.

Then as shown in FIG. 14, a second insulating layer 4b is formed over the first insulating layer 4a so that the first conductive coil 5a is embedded therein. Similarly, a spiral second conductive coil 5b is formed on the second insulating layer 4b, and then a third insulating layer 4c is formed over the second conductive coil 5b so that the second conductive coil 5b is embedded therein.

The respective front portions of the second insulating layer 4b and the third insulating layer 4c are shaped in the following manner.

As shown in FIG. 14, the respective front portions of the second insulating layer 4b and the third insulating layer 4c are shaped so as to be flush with a slop ascending from the upper edge of the sloping end surface of the first insulating layer 4a at an inclination $\theta_2$ in a range defined by: $30° \leq \theta_2 \leq 80°$. The length $L_2$ of the orthogonal projection of the sloping surface including those of the second insulating layer 4b and the third insulating layer 4c on the surface of the lower magnetic layer 2 is in a range defined by: $3 \mu m \leq L_2 \leq 30 \mu m$.

Then, a gap film 7 of SiO$_2$ or the like is formed over the sloping surfaces of the first insulating layer 4a and the second insulating layer 4b, the third insulating layer 4c and areas corresponding to the front gap FG and the back gap BG.

Then, a thin film of a Fe-Al-Si alloy or the like is formed over the gap film 7 in an area extending from a portion corresponding to the front gap FG to a portion corresponding to the back gap BG, and then the thin film is etched to form the upper magnetic layer 3 having a magnetic gap section 3a extending in parallel to the lower magnetic layer 2, a first sloping section 3b extending from the back end of the magnetic gap section 3a and gently ascending backward along the sloping surface of the first insulating layer 4a, and a second sloping section 3c extending from the back end of the first sloping section 3b and sharply ascending backward along the sloping surfaces of the second insulating layer 4b and the third insulating layer 4c.

Finally, a sliding surface 8 is finished by polishing to determine the depth of the front gap FG to complete a thin film magnetic head.

Although the present invention has been described with reference the thin film magnetic head embodying the present invention, the present invention is not limited thereto in its practical application; many changes and variations are possible therein without departing from the scope and spirit thereof.

Figure 15:
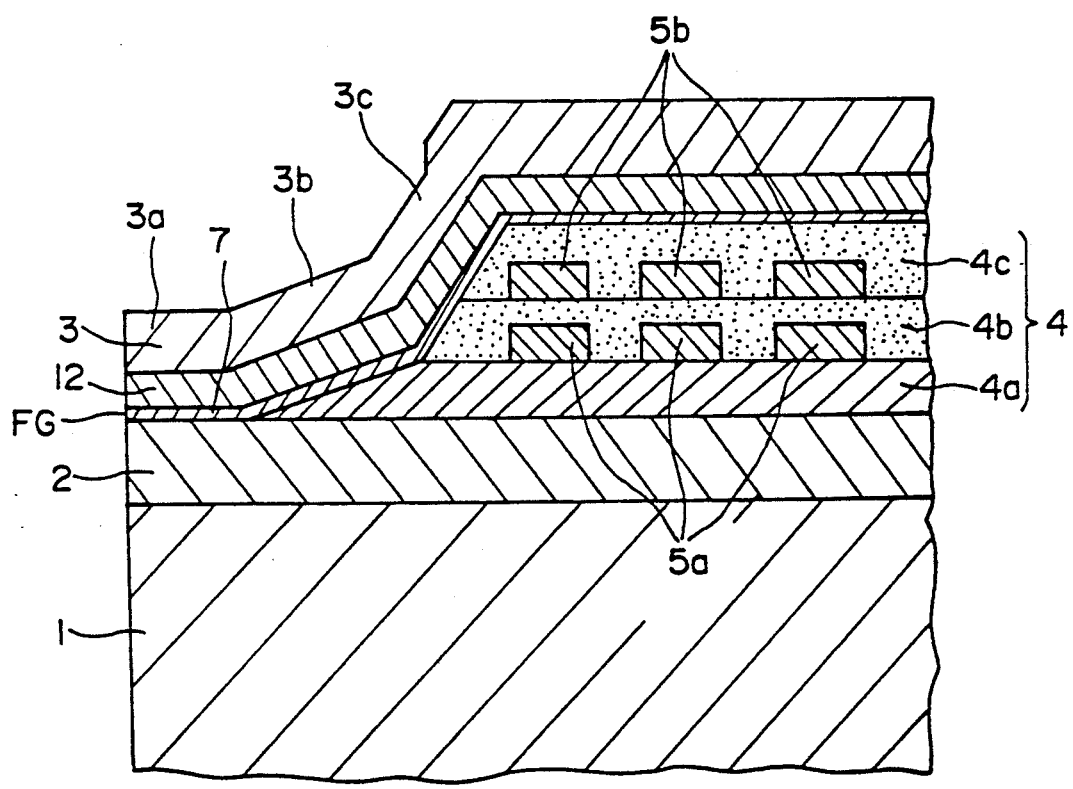
FIG. 15 is an enlarged sectional view of an essential portion of a thin film magnetic head in a second embodiment according to the present invention.

In a modification, a film of a material having a high saturation magnetic flux density Bs may be formed between the upper magnetic layer 3 and the gap film 7 to prevent the saturation of the magnetic gap section 3a more effectively. That is, as shown in FIG. 15, a magnetic film 12 of a material having a high saturation magnetic flux density Bs, such as a Fe-Al-Si alloy or a Fe-Ru-Ga-Si alloy, between the upper magnetic layer 3 and the gap film 7 in a thickness sufficient to prevent the saturation of the upper magnetic layer 3. When a portion of the upper magnetic layer 3 near the front gap FG is almost saturated, magnetic flux leaks into the magnetic film 12 having a high saturation magnetic flux density Bs, so that the saturation of the upper magnetic layer 3 is prevented.

The magnetic layer 12 is formed as a base layer for the upper magnetic layer 3 over the gap film 7 by plating or suitable means, and unnecessary portions of the magnetic layer 12 are removed by etching. Although the magnetic layer 12 requires an additional time for film formation and etching, the process need neither to be modified nor to be complicated.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A thin film magnetic head having a lower magnetic layer and an upper magnetic layer formed over the lower magnetic layer and a gap film so that a small gap is formed between a first magnetic gap section of the lower magnetic layer near a sliding surface to be brought into sliding contact with a magnetic recording medium and a second magnetic gap section of the upper magnetic layer extending in parallel to the said first magnetic gap section of the lower magnetic layer near the sliding surface;

characterized in that the upper magnetic layer has a first sloping section extending from the said second magnetic gap section and inclined at an inclination $\theta_1$ in a range defined by: $2° \leq \theta \leq 25°$ to the upper surface of the lower magnetic layer, and a second sloping section extending from the first sloping section at an inclination $\theta_2$ in a range defined by $30° \leq \theta_2 \leq 80°$ to the upper surface of the lower magnetic layer.

2. A thin film magnetic head according to claim 1, wherein the thickness of the upper magnetic layer is 3 $\mu m$ or below.

3. A thin film magnetic head according to claim 1, wherein the track width is 10 $\mu m$ or below.

* * * * *